United States Patent
Standifer

(10) Patent No.: US 12,447,784 B2
(45) Date of Patent: Oct. 21, 2025

(54) SUBFRAME ATTACHMENT SYSTEM FOR VEHICLE

(71) Applicant: Ford Global Technologies, LLC, Dearborn, MI (US)

(72) Inventor: Cliff Standifer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 764 days.

(21) Appl. No.: 17/824,989

(22) Filed: May 26, 2022

(65) Prior Publication Data

US 2023/0382172 A1      Nov. 30, 2023

(51) Int. Cl.
| | |
|---|---|
| *B60D 1/48* | (2006.01) |
| *B60D 1/01* | (2006.01) |
| *B60D 1/06* | (2006.01) |
| *B62D 21/11* | (2006.01) |

(52) U.S. Cl.
CPC .............. *B60D 1/488* (2013.01); *B60D 1/015* (2013.01); *B60D 1/06* (2013.01); *B62D 21/11* (2013.01); *B60G 2204/15* (2013.01)

(58) Field of Classification Search
CPC .......... B60D 1/488; B60D 1/015; B60D 1/06; B62D 21/11; B60G 2204/15
USPC ....................................................... 280/504
See application file for complete search history.

(56) References Cited

U.S. PATENT DOCUMENTS

| | | | | |
|---|---|---|---|---|
| 3,796,444 A | * | 3/1974 | Hixon ...................... | B60D 1/06 280/483 |
| 7,793,968 B1 | * | 9/2010 | Withers ................... | B60D 1/07 280/425.2 |
| 9,150,067 B2 | | 10/2015 | Hartleip et al. | |
| 10,870,454 B2 | | 12/2020 | McCoy et al. | |
| 10,967,688 B2 | | 4/2021 | Garner et al. | |
| 10,967,689 B2 | | 4/2021 | Stanifer et al. | |
| 11,247,518 B1 | * | 2/2022 | Works ..................... | B60D 1/247 |
| 2014/0117645 A1 | * | 5/2014 | McCall ................... | B60D 1/015 280/507 |
| 2017/0305218 A1 | | 10/2017 | Stanifer et al. | |

(Continued)

OTHER PUBLICATIONS etrailer.com, Curt Custom 5th Wheel Installation Kit for Ford—Gloss Finish, product pages, available at URL https://www.etrailer.com/Fifth-Wheel-Installation-Kit/CURT/C16424-104.html.

(Continued)

*Primary Examiner* — Jacob D Knutson
*Assistant Examiner* — Mohamed M Medani
(74) *Attorney, Agent, or Firm* — Burris Law, PLLC

(57) ABSTRACT

A subframe attachment system for a vehicle includes a front brace, a rear brace assembly, and tethers. The front brace extends in a transverse direction of the vehicle and is configured to be mounted to a pair of longitudinal rails of a main frame of the vehicle. The front brace includes front mounting apertures configured to be accessible from the cargo bed. The rear brace assembly is spaced apart from the front brace and extends in the transverse direction of the vehicle. The rear brace assembly is configured to be mounted to the main frame and includes rear mounting apertures configured to be accessible from the cargo bed. The tethers include a first end rotatably coupled to the rear brace assembly and a second end configured to be mounted to respective longitudinal rails of the pair of longitudinal rails.

20 Claims, 9 Drawing Sheets

(56) References Cited

U.S. PATENT DOCUMENTS

2018/0257710 A1* 9/2018 Komiya .................. B60K 5/12
2020/0070905 A1 3/2020 Guthard et al.
2020/0398622 A1* 12/2020 McGory ................ B60D 1/015

OTHER PUBLICATIONS etrailer.com, B&W Custom Installation Kit w/Base Rails for 5th Wheel Trailer Hitches, product pages, available at URL https://www.etrailer.com/Fifth-Wheel-Installation-Kit/B-and-W/BWRVK2505.html.

etrailer.com, Reese Quick-Install Custom Installation Kit w/ Base Rails for 5th Wheel Trailer Hitches, product pages, available at URL https://www.etrailer.com/Fifth-Wheel-Installation-Kit/Reese/RP50087-58.html.

Reckless Offsets, YouTube Video, Installing Fifth-wheel Rails in a 2018 F-150, Super Brand Tools, available at URL https://www.youtube.com/watch?v=x7474glleDw.

Ford Store, Premium Carbon Black Locking Bed Cleat 4pc Kit, product page, available at URL https://accessories.ford.com/premium-carbon-black-locking-bed-cleat-4pc-kit-1.

etrailer.com, Replacement Ball for Reese Elite Series and Factory Ford and Dodge Gooseneck Hitches—2-5/16", product pages, available at URL https://www.etrailer.com/Trailer-Hitch-Ball/Reese/RP19311.html?feed=npn&utm_source=google&utm_medium=cpc&utm_campaign=Google%20%7C%20Shop%20-%20Trailer%20Hitch%20Ball&adgroupid=88664136849&campaignid=203253377&creative=404001548375&device=c&devicemodel=&feedite.

* cited by examiner

SUBFRAME ATTACHMENT SYSTEM FOR VEHICLE

FIELD

The present disclosure relates to a subframe attachment system for a vehicle and a vehicle having a subframe attachment system.

BACKGROUND

The statements in this section merely provide background information related to the present disclosure and may not constitute prior art.

It is generally known in the towing industry to utilize a fifth wheel or hitch or a gooseneck hitch to secure a trailer to a bed of a towing vehicle, such as a pickup truck. Underbed systems have been developed to accommodate either a fifth wheel hitch system or a gooseneck hitch system. Such systems, however, typically cannot accommodate both the fifth wheel hitch and the gooseneck hitch without requiring a labor-intensive conversion process. Furthermore, such systems do not provide for additional uses other than accommodating the fifth wheel hitch or the gooseneck hitch.

These issues related to hitch systems, among other issues related to hitch systems, are addressed by the present disclosure.

SUMMARY

This section provides a general summary of the disclosure and is not a comprehensive disclosure of its full scope or all of its features.

In one form, the present disclosure discloses a subframe attachment system for a vehicle that includes a front brace, a rear brace assembly, and tethers. The front brace extends in a transverse direction of the vehicle and is configured to be mounted to a pair of longitudinal rails of a main frame of the vehicle. The front brace includes front mounting apertures configured to be accessible from the cargo bed. The rear brace assembly is spaced apart from the front brace and extends in the transverse direction of the vehicle. The rear brace assembly is configured to be mounted to the main frame and includes rear mounting apertures configured to be accessible from the cargo bed. The tethers comprise a first end rotatably coupled to the rear brace assembly and a second end configured to be mounted to respective longitudinal rails of the pair of longitudinal rails.

In variations of the subframe attachment system of the above paragraph, which may be implemented individually or in any combination: the rear brace assembly is configured to be mounted to a cross member of the main frame of the vehicle and comprises a first connecting brace and a second connecting brace, the first connecting brace is configured to be disposed within the cross member and the second connecting brace is configured to be disposed on the cross member; a first set of fasteners extending through the first connecting brace and configured to mechanically fasten the first connecting brace to the pair of longitudinal rails and a second set of fasteners extending through the second connecting brace and configured to mechanically fasten the second connecting brace to the cross member; the tethers are rotatably coupled to the second connecting brace of the rear brace assembly; a pair of spaced apart attachment members are secured to the front brace and the second connecting brace and extend in a longitudinal direction of the vehicle; an optional gooseneck attachment assembly is mounted on the pair of attachment members; each tether further comprises a body connecting the first end and the second end, the body comprises a varying cross-section; the second end of each tether comprises a compression tube configured to extend at least partially through a respective longitudinal rail of the pair of longitudinal rails; brackets are configured to be disposed within respective longitudinal rails of the pair of longitudinal rails; fasteners extend through the front brace and the brackets and are configured to mechanically fasten the front brace and the brackets to the respective longitudinal rails; the brackets include a first portion extending in a horizontal direction and a second portion extending in a vertical direction from the first portion, the first portion includes an integral nut that receives a respective fastener of the fasteners; and the gooseneck attachment assembly comprises a mount frame mounted to the pair of attachment members and a mount body secured to the mount frame and comprising a gooseneck receiving feature accessible from the cargo bed.

In another form, the present disclosure discloses a subframe attachment system for a vehicle that includes a front brace, a rear brace, and tethers. The front brace extends in a transverse direction of the vehicle and is configured to be mounted to a pair of longitudinal rails of a main frame of the vehicle. The front brace includes front mounting apertures configured to be accessible from the cargo bed. The rear brace assembly is spaced apart from the front brace and extends in the transverse direction of the vehicle. The rear brace assembly is configured to be mounted to the main frame and includes a first connecting brace, a second connecting brace and rear mounting apertures. The first connecting brace is configured to be disposed within the cross member. The second connecting brace is configured to be disposed on the cross member. The rear mounting apertures are configured to be accessible from the cargo bed. The tethers comprise a first end rotatably coupled to the second connecting brace and a second end configured to be mounted to respective longitudinal rails of the pair of longitudinal rails.

In yet another form, the present disclosure discloses a vehicle comprising a cargo bed and a subframe attachment system. The cargo bed includes a floor panel. The subframe system is located substantially underneath the floor panel and comprises a front brace, a rear brace assembly, and tethers. The front brace extends in a transverse direction of the vehicle and is configured to be mounted to a pair of longitudinal rails of a main frame of the vehicle. The front brace comprises front mounting apertures extending through the floor panel of the cargo bed. The rear brace assembly is spaced apart from the front brace and extends in the transverse direction of the vehicle. The rear brace assembly is configured to be mounted to the main frame and comprises rear mounting apertures extending through the floor panel of the cargo bed. The tethers are rotatably coupled to the rear brace assembly and are configured to be mounted to respective longitudinal rails of the pair of longitudinal rails.

In variations of the subframe attachment system of the above paragraph, which may be implemented individually or in any combination: the cargo bed comprises a plurality of ridges, the front and rear mounting apertures are positioned below the ridges; and the subframe attachment system further includes a pair of spaced apart attachment members secured to the front brace and the rear brace assembly and extending in a longitudinal direction of the vehicle, and a gooseneck attachment assembly mounted on the pair of attachment members.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
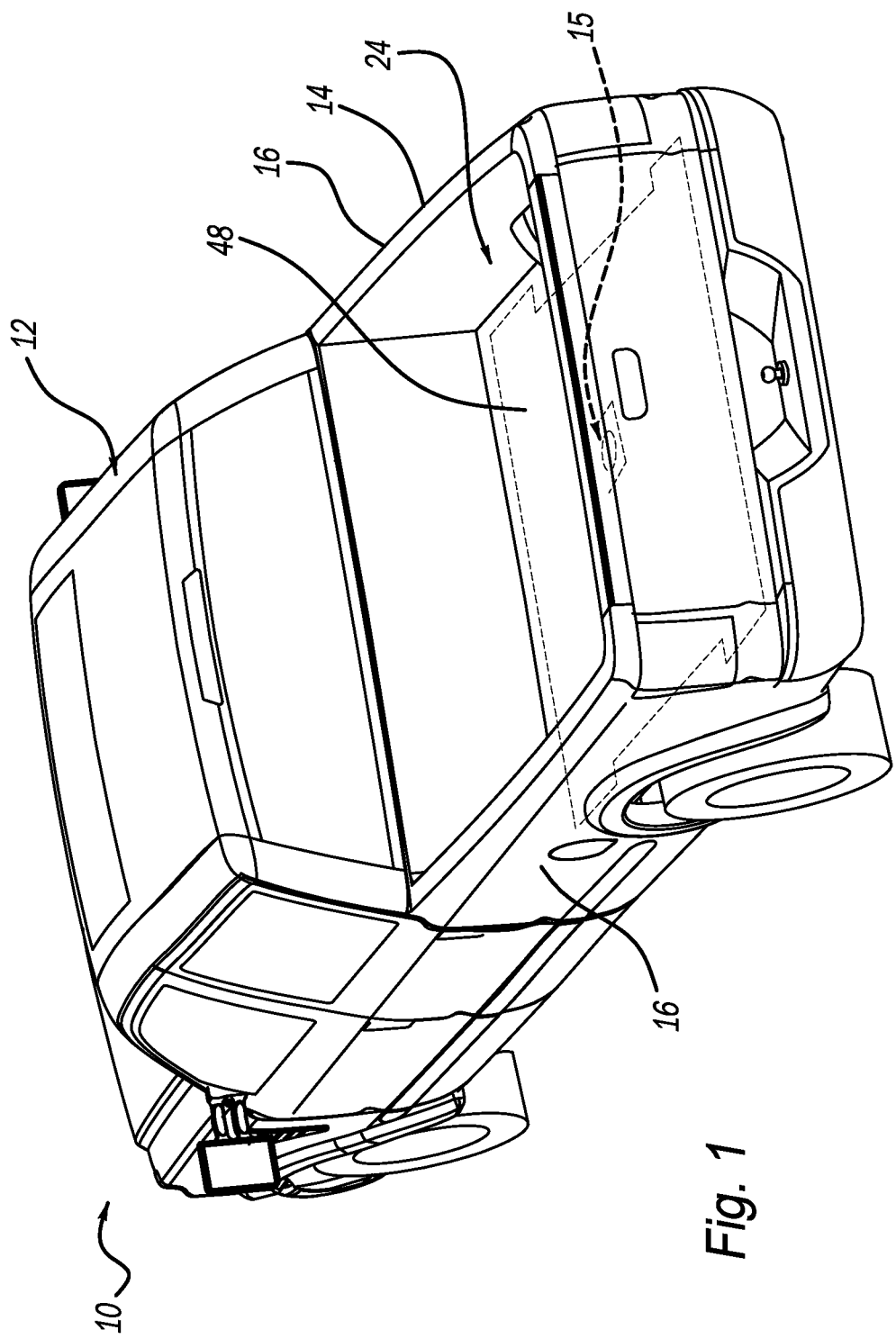
FIG. 1 is a perspective of a vehicle including a subframe attachment system according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as a pick-up truck, for example, is illustrated. The vehicle 10 includes a cab 12, a plurality of wheels, a cargo bed or component 14, and a subframe hitch system or subframe attachment system 15. The cargo bed 14 extends from the cab 12 and includes a plurality of side walls 16 and a tailgate. The plurality of side walls 16 extend from an aft end of the cab 12. The tailgate is coupled to the side walls 16 and is pivotable about a horizontal axis (not shown) between a closed position and an open position. When the tailgate is in the closed position, the tailgate cooperates with the side walls 16 to define a partially enclosed cargo area 24. When the tailgate is in the open position, the side walls 16 define an opening to the cargo area 24. In one example, cargo such as 2x4s, piping, tubing and other materials to be transported from a facility to a jobsite or dwelling, for example, may be stored and transported in the cargo area 24.

Figure 2:
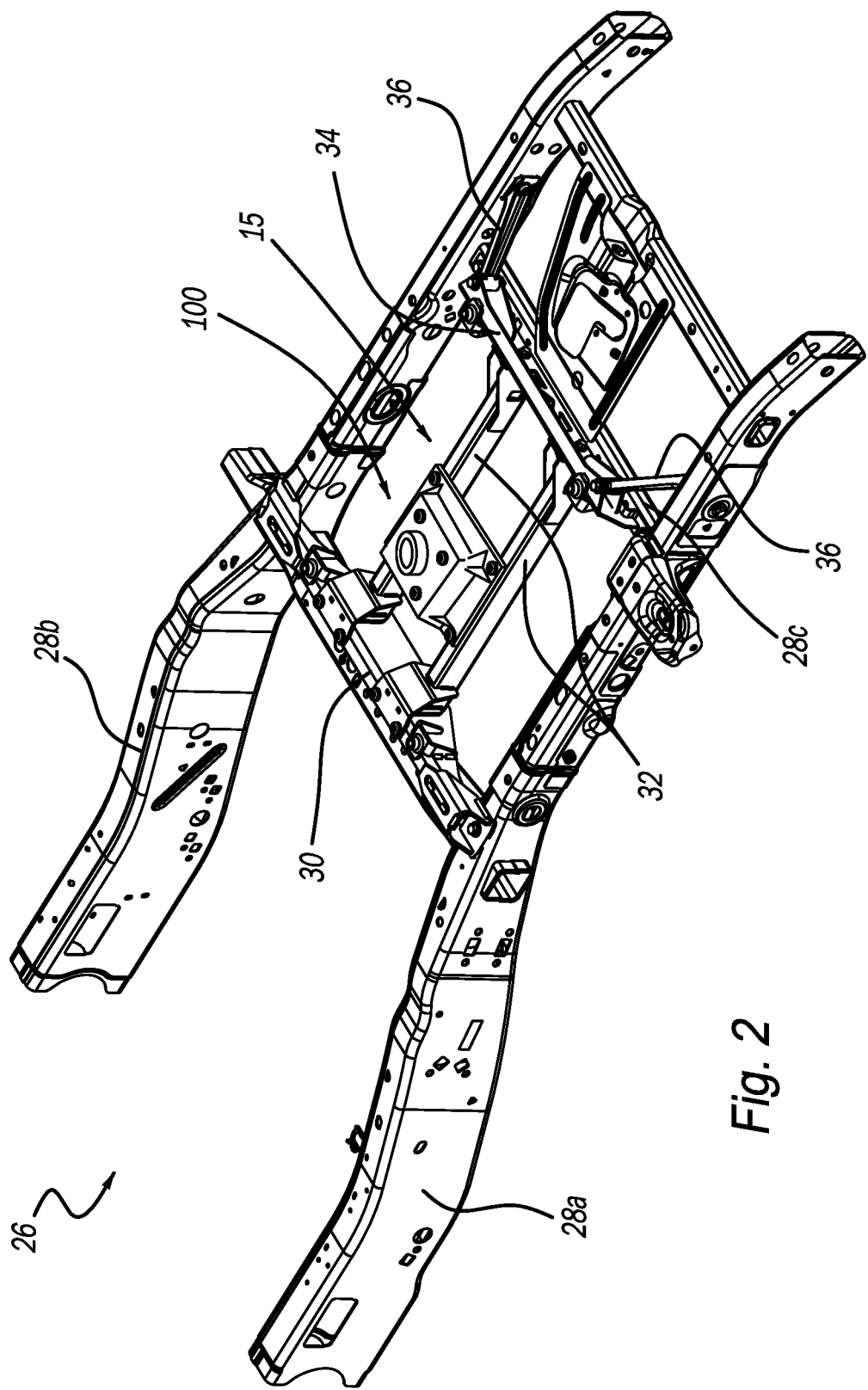
FIG. 2 is a perspective view of the subframe attachment system of FIG. 1 mounted to a frame of the vehicle.
Figure 3:
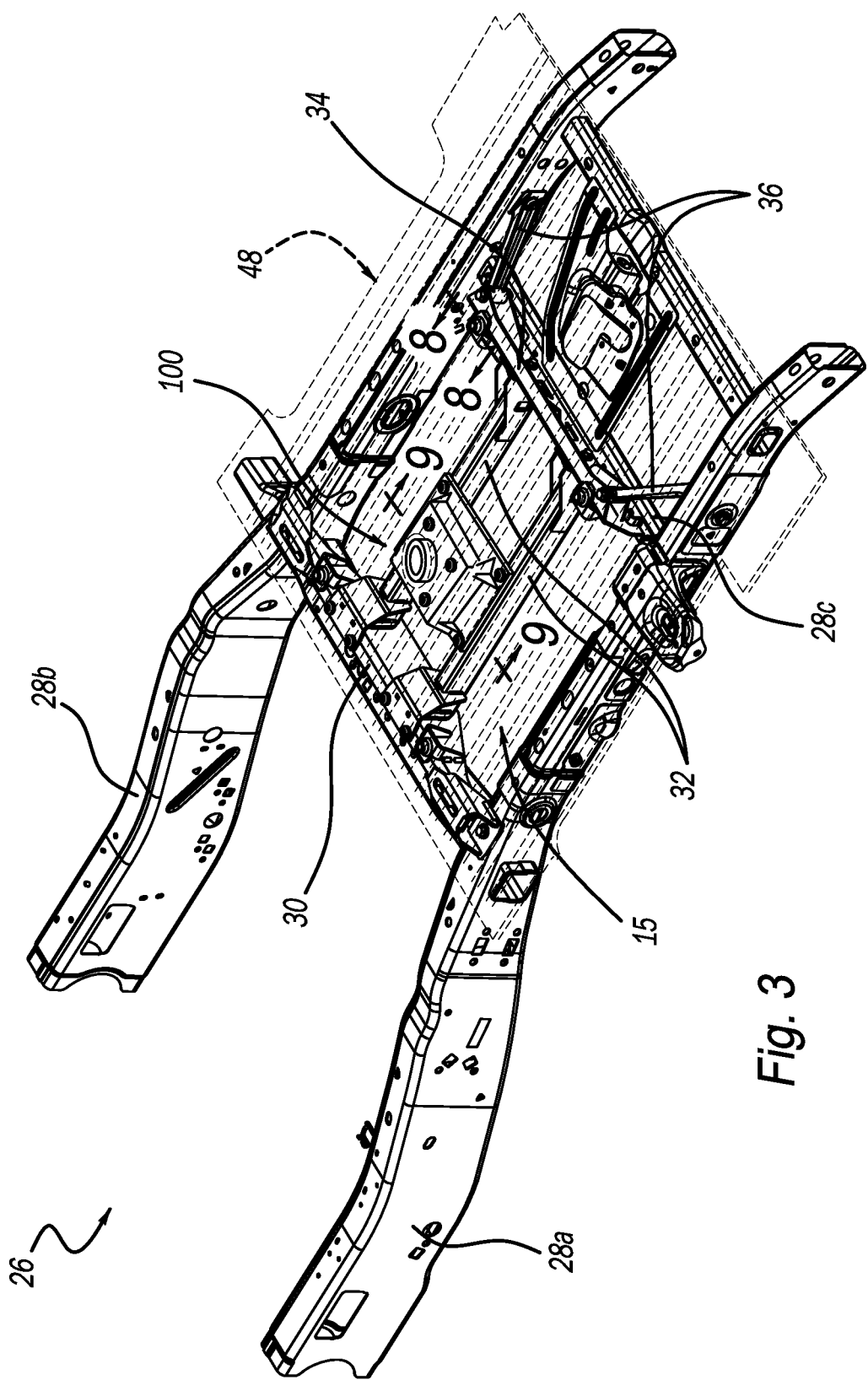
FIG. 3 is a perspective view of the subframe attachment system of FIG. 1 mounted to a frame of the vehicle and extending through a floor of a cargo bed.

With additional reference to FIGS. 2 and 3, a vehicle frame 26 is the main supporting structure of the vehicle 10, to which various components such as the cargo bed 14 are attached either directly or indirectly. The vehicle frame 26 includes opposed longitudinal rails 28a, 28b and one or more cross members 28c. The rails 28a, 28b are spaced apart from each other and may establish a length of the vehicle frame 26. The cross members 28c extend in a transverse direction of the vehicle 10 and are spaced apart from each other along a longitudinal direction of the vehicle 10. The cross members 28c also connect the rails 28a, 28b to each other.

Figure 4:
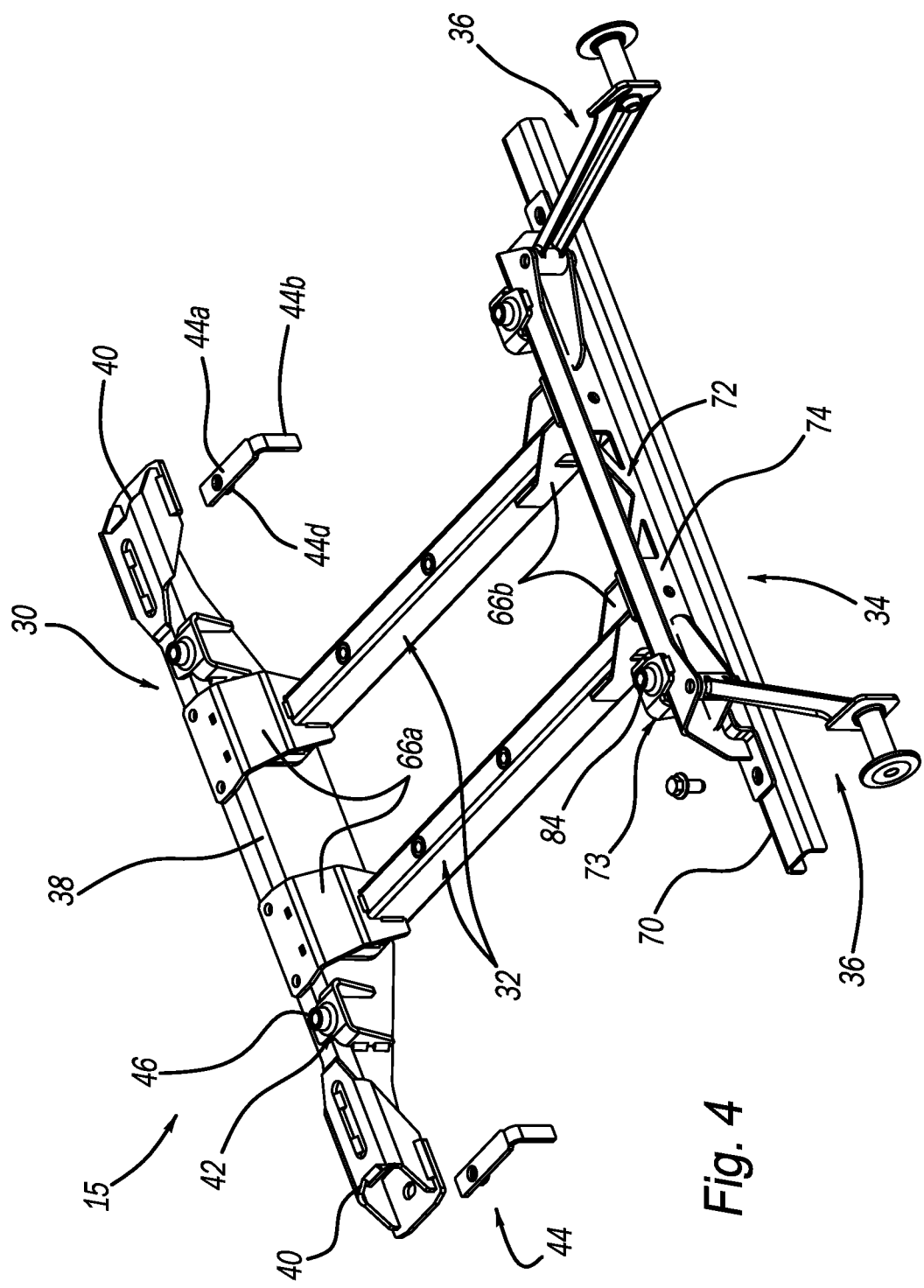
FIG. 4 is a perspective view of the subframe attachment system of FIG. 1.
Figure 5:
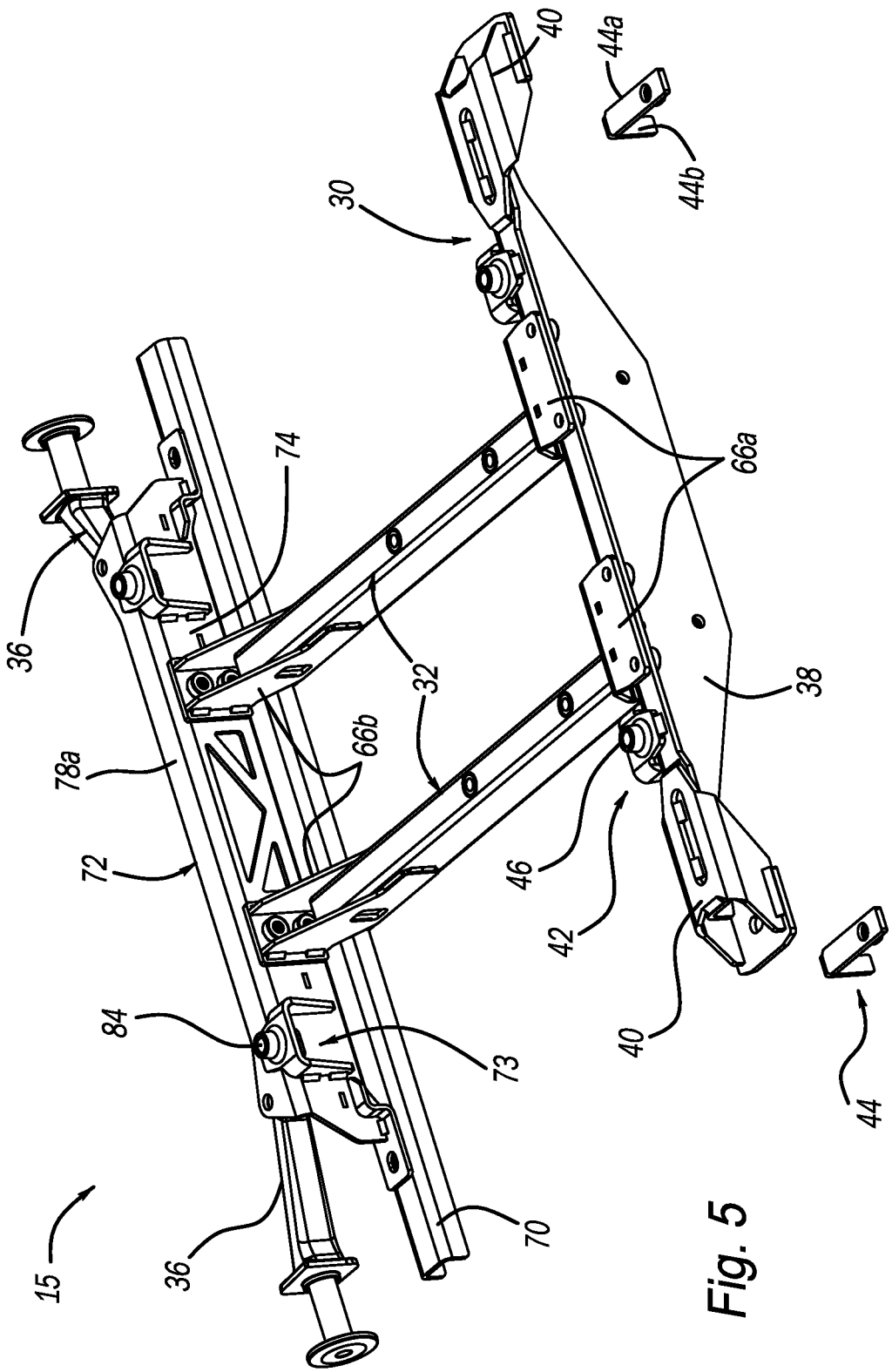
FIG. 5 is another perspective view of the subframe attachment system of FIG. 1.
Figure 6:
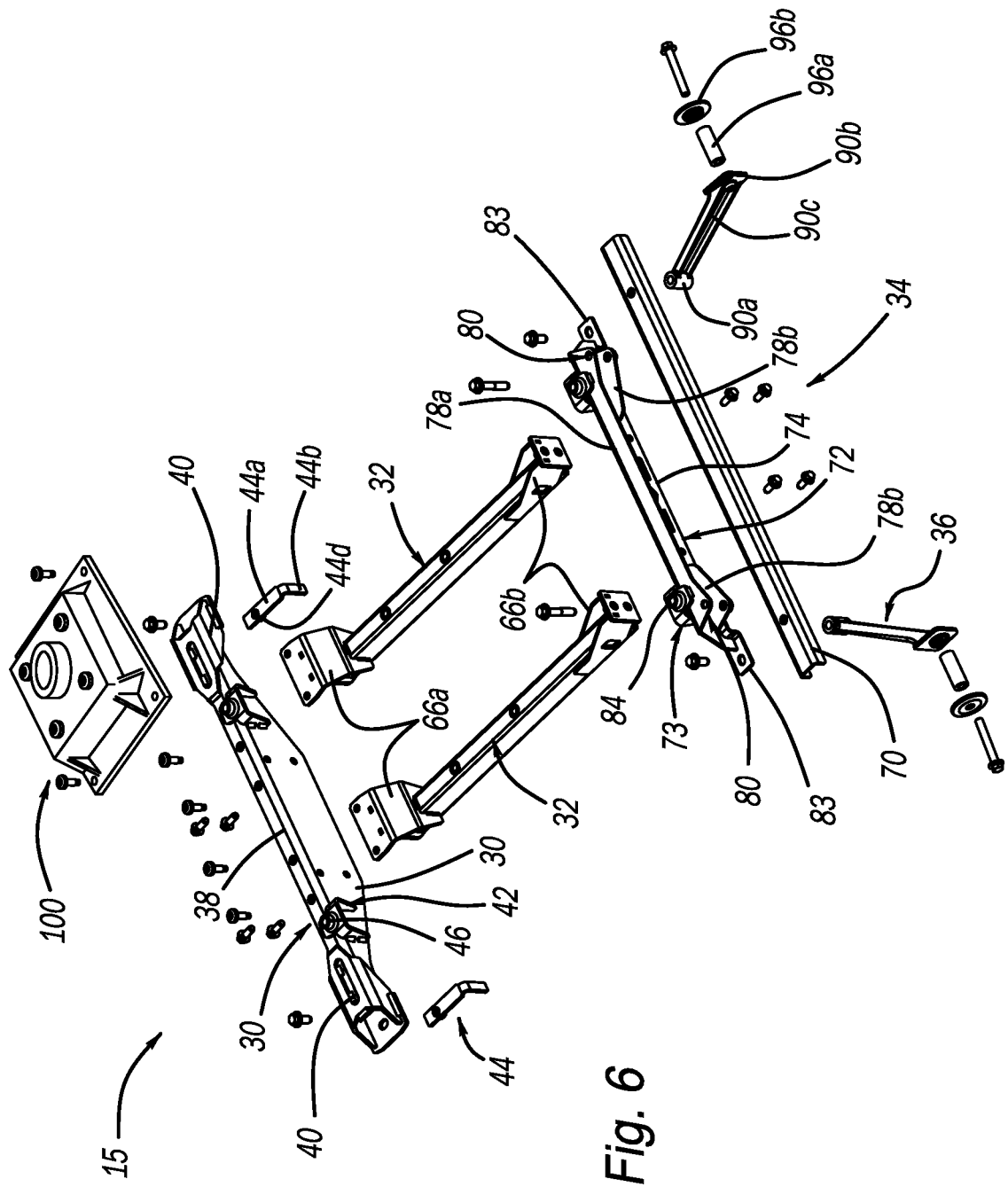
FIG. 6 is an exploded view of the subframe attachment system of FIG. 1.

With reference to FIGS. 2-6 and 8, the subframe attachment system 15 is mounted to the vehicle frame 26 and is substantially located underneath the cargo bed 14. The subframe attachment system 15 comprises a front brace assembly 30, a pair of intermediate braces 32, a rear brace assembly 34, and a pair of tethers 36. The front brace assembly 30 is mounted to the longitudinal rails 28a, 28b of the vehicle frame 26 (FIGS. 2 and 3) and comprises a front brace 38, end mounting brackets 40 and cargo mounting brackets 42. The front brace 38 extends in a transverse direction of the vehicle 10 between the longitudinal rails 28a, 28b. The end mounting brackets 40 are secured to opposing ends of the front brace 38 and are mounted on respective longitudinal rails 28a, 28b. In the example illustrated, the end mounting brackets 40 are welded to opposing ends of the front brace 38 such that the end mounting brackets 40 and the front brace 38 form a unitized structure. In some forms, the end mounting brackets 40 are secured to the front brace 38 via mechanical fasteners such as bolts or screws, for example. The end mounting brackets 40 comprise mounting structures or apertures (e.g., openings). The end mounting brackets 40 are mounted to the longitudinal rails 28a, 28b via the mounting apertures and L-shaped attachment brackets 44 (FIGS. 4-6). Each attachment bracket 44 includes a first portion 44a extending in a horizontal direction and a second portion 44b extending in a vertical direction from an end of the first portion 44a. The first portion 44a comprises a mounting structure or aperture (e.g., an opening). A nut 44d is integral with the first portion 44a and is aligned with the mounting aperture.

The cargo mounting brackets 42 are secured to the front brace 38 between the end mounting brackets 40. Each cargo mounting bracket 42 comprises a mounting structure or aperture 46 that extends at least partially through a floor 48 of the cargo bed 14 such that the mounting aperture 46 is accessible from the floor 48. In the example illustrated, the cargo mounting brackets 42 are welded to a top wall and a vertical side wall of the front brace 38 such that the cargo mounting brackets 42 and the front brace 38 form a unitized structure. In the example illustrated, each mounting aperture 46 extends upwardly at least partially through the floor 48 of the cargo bed 14 and is positioned below the ridges 52 of the cargo bed 14. In this way, cargo disposed within the cargo bed 14 is not obstructed by the mounting apertures 46. In some forms, each mounting aperture 46 is flush with the ridges 52 of the cargo bed 14. Each mounting aperture 46 comprises an opening that is configured to cooperate with towing components such as legs of a fifth wheel platform, an above-bed hitch mounting mechanism, safety chain tie down members, or other items that desire a high degree of strength to provide a robust attachment. In some forms, each mounting aperture 46 includes internal threads to facilitate attachment with the towing components. Each mounting aperture 46 is also positioned between two adjacent ridges 52 of the cargo bed 14 and is sized to allow a variety of uses of the mounting aperture 46 using a common fastener such as a bolt or screw.

To mount the front brace assembly 30 onto the longitudinal rails 28a, 28b, an installer first positions a respective attachment bracket 44 within a respective longitudinal rail 28a, 28b via an opening in the respective longitudinal rail 28a, 28b. Then, while holding the second portion 44b of the attachment bracket 44 in position such that the mounting aperture of the attachment bracket 44 is aligned with the mounting aperture of the end mounting bracket 40, the installer extends a fastener through the mounting apertures of the front brace 38 and the attachment bracket 44, through a portion of the longitudinal rail 28a, 28b, and through the integral nut 44d, thereby securing the front brace assembly 30 onto the longitudinal rails 28a, 28b.

The pair of intermediate braces or attachment members 32 are spaced apart from each other and extend along a length of the vehicle 10. The pair of intermediate braces 32 are also secured to the front brace 38 and the rear brace assembly 34. Stated differently, each intermediate brace 32 of the pair of intermediate braces 32 comprises a first end secured to the top wall of the front brace 38 by mechanical fasteners such as bolts or screws, for example, and an opposing second end secured to the rear brace assembly 34 by mechanical fasteners such as bolts or screws, for example. In the example illustrated, an arcuate shaped first end bracket 66a is secured to the first end of the intermediate brace 32 and is, in turn, secured to the top wall of the front brace 38. Similarly, a second end bracket 66b is secured to the second end of the intermediate brace 32 and is, in turn, secured to the rear brace assembly 34. In the example illustrated, the first and second end brackets 66a, 66b are welded to the intermediate brace 32 such that the first and second end brackets 66a, 66b and the intermediate brace 32 form a unitized structure.

With continued reference to FIGS. 2-6 and 8, the rear brace assembly 34 is mounted to one cross member 28c of the vehicle frame 26 (FIGS. 2 and 3) and comprises a first connecting brace 70, a second connecting brace 72, and cargo mounting brackets 73. The first connecting brace 70 has a U shape and extends in a transverse direction of the vehicle 10 between the longitudinal rails 28a, 28b. The first connecting brace 70 is also disposed within the cross member 28c. The second connecting brace 72 is disposed on the cross member 28c and is mounted to the cross member 28c and the first connecting brace 70 by mechanical fasteners such as bolts or screws, for example. The second connecting brace 72 comprises a vertical wall 74. The vertical wall 74 faces the vertical side wall of the front brace 38 and comprises apertures that permit connection to respective intermediate braces 32 by the mechanical fasteners such as bolts or screws, for example. In the example illustrated, triangular-shaped apertures are formed in the vertical wall 74 between the mounting apertures, thereby reducing the weight of the second connecting brace 72. With reference to FIG. 6, an upper flange 78a extends perpendicular from an upper end of the vertical wall 74. The upper flange 78a also extends along an entire length of the upper end of the vertical wall 74 and comprises apertures 80 at opposing ends thereof. A pair of lower flanges 78b extend perpendicular from the vertical wall 74 at or near a lower end of the vertical wall 74. Each lower flange 78b extends from a respective end of the vertical wall 74 and comprises an aperture aligned with a respective aperture 80 of the upper flange 78a. In this way, a pair of clevis fastener structures are formed.

The cargo mounting brackets 73 are secured to the second connecting brace 72 between end mounts 83 of the second connecting brace 72. Each cargo mounting bracket 73 comprises a mounting structure or aperture 84 that extends upwardly at least partially through the floor 48 of the cargo bed 14 such that the mounting aperture 84 is accessible from the floor 48. In the example illustrated, the cargo mounting brackets 73 are welded to the vertical wall 74 and the upper flange 78a such that the cargo mounting brackets 73 and the second connecting brace 72 form a unitized structure. In the example illustrated, each mounting aperture 84 extends upwardly at least partially through the floor 48 of the cargo bed 14 and is positioned below (FIG. 8) the ridges 52 of the cargo bed 14. In this way, cargo disposed within the cargo bed 14 is not obstructed by the mounting apertures 84. In some forms, each mounting aperture 84 is flush with the ridges 52 of the cargo bed 14. Each mounting aperture 84 comprises an opening that is configured to cooperate with towing components such as legs of a fifth wheel platform, an above-bed hitch mounting mechanism, safety chain tie down members, or other items that desire a high degree of strength to provide a robust attachment. In some forms, the mounting aperture 84 includes internal threads to facilitate attachment with other components. Each mounting aperture 84 is also positioned between two adjacent ridges 52 of the cargo bed 14 and is sized to allow a variety of uses of the mounting aperture 84 such as uses using a common fastener such as a bolt or screw.

To mount the rear brace assembly 34 onto the cross member 28c, the installer first extends the first connecting brace 70 at least partially through the cross member 28c from a side opening in the longitudinal rail 28a, 28b. Then, the installer positions the second connecting brace 72 onto the cross member 28c so that apertures in the end mounts 83 are aligned with respective openings (not shown) of the cross member 28c and respective openings in the first connecting brace 70. Then, the installer extends a fastener through the apertures of a respective end mount 83, through a respective opening of the cross member 28c, through a respective opening of the first connecting brace 70, and through a threaded nut (not shown) welded on an underside of the first connecting brace 70, thereby securing the rear brace assembly 34 to the cross member 28c.

Each tether 36 is rotatably coupled to the second connecting brace 72 and is configured to be mounted to a respective the longitudinal rail 28a, 28b. With reference to FIG. 6, each tether 36 comprises a first end 90a, a second end 90b, and an elongated body 90c connecting the first end 90a and the second end 90b to each other. The first end 90a has a generally cylindrical shape and is positioned between the upper flange 78a and a respective lower flange 78b such that an aperture extending through the first end 90a is vertically aligned with the aperture 80 of the flange 78a and the aperture of the flange 78b. In this way, a fastener extends vertically through the flanges 78a, 78b and the first end 90a, thereby rotatably coupling the tether 36 to the second connecting brace 72.

The second end 90b includes a flat surface that corresponds to an inner surface of the respective longitudinal rail 28a, 28b. In the example illustrated, the flat surface is square. In some forms, the flat surface can be circular, rectangular, or any other suitable shape. A compression tube or limiter 96a extends from the second end 90b and at least partially through the respective the longitudinal rail 28a, 28b. The compression limiter 96a inhibits the longitudinal rail 28a, 28b from deforming during assembly of the tethers 36 of the subframe attachment system 15 to the vehicle frame 26. A washer or mounting plate 96b is positioned on an outer surface of the respective longitudinal rail 28a, 28b. A fastener such as a bolt or screw, for example, extends through the washer 96b, the compression tube 96a, and the second end 90b of the tether 36, thereby securing the washer 96b and the tether 36 to the respective the longitudinal rail 28a, 28b. The body 90c comprises a varying cross-section as the body 90c extends from the first end 90a toward the second end 90b. That is, a cross-sectional area of the body 90c at the second end 90b is greater than a cross-sectional area of the body 90c at the first end 90a.

Figure 7:
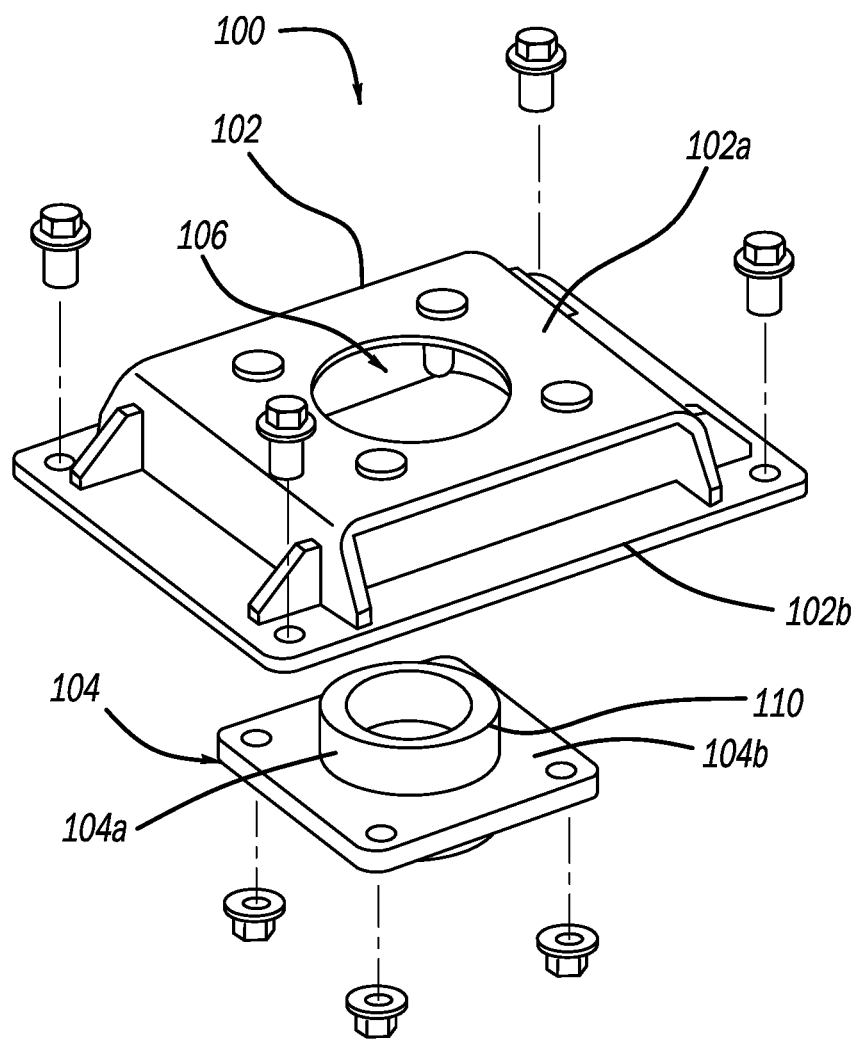
FIG. 7 is an exploded view of an optional gooseneck attachment assembly.
Figure 8:
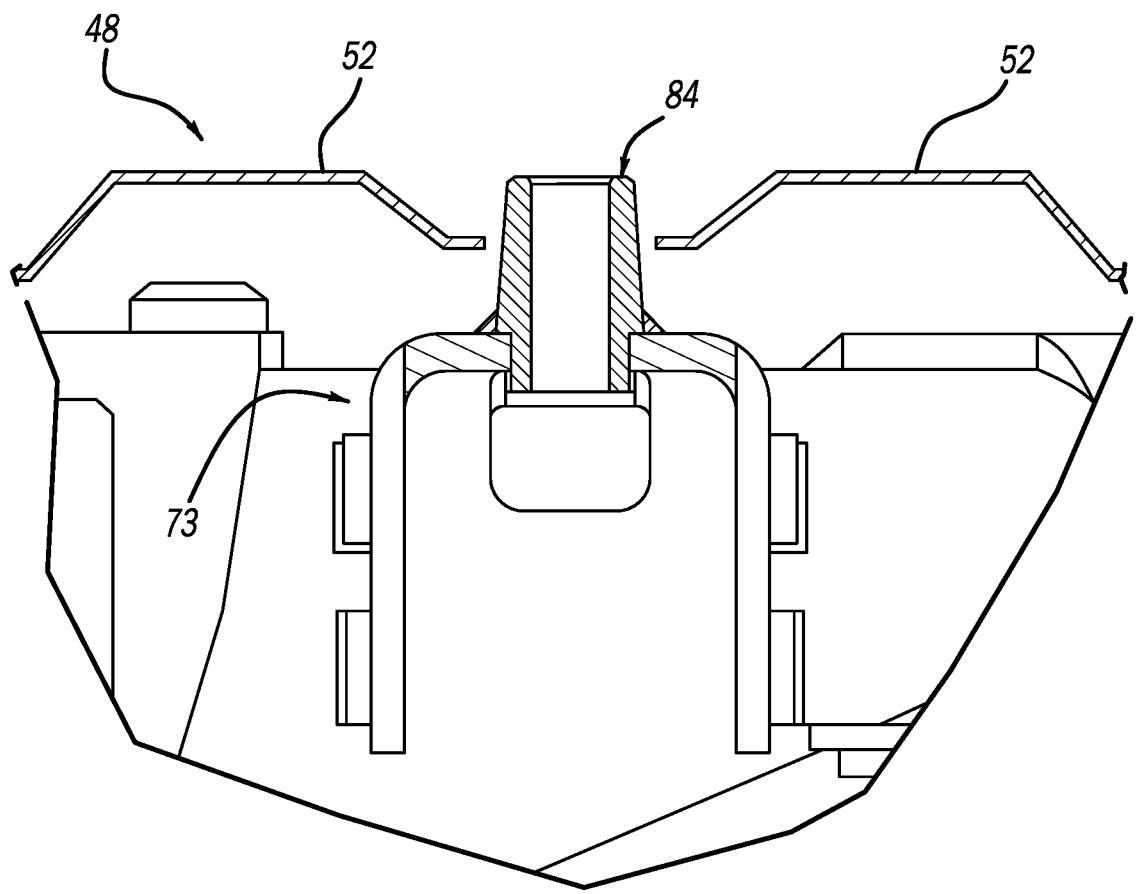
FIG. 8 is a cross-sectional view of the subframe attachment system taken along line 8-8 of FIG. 3.
Figure 9:
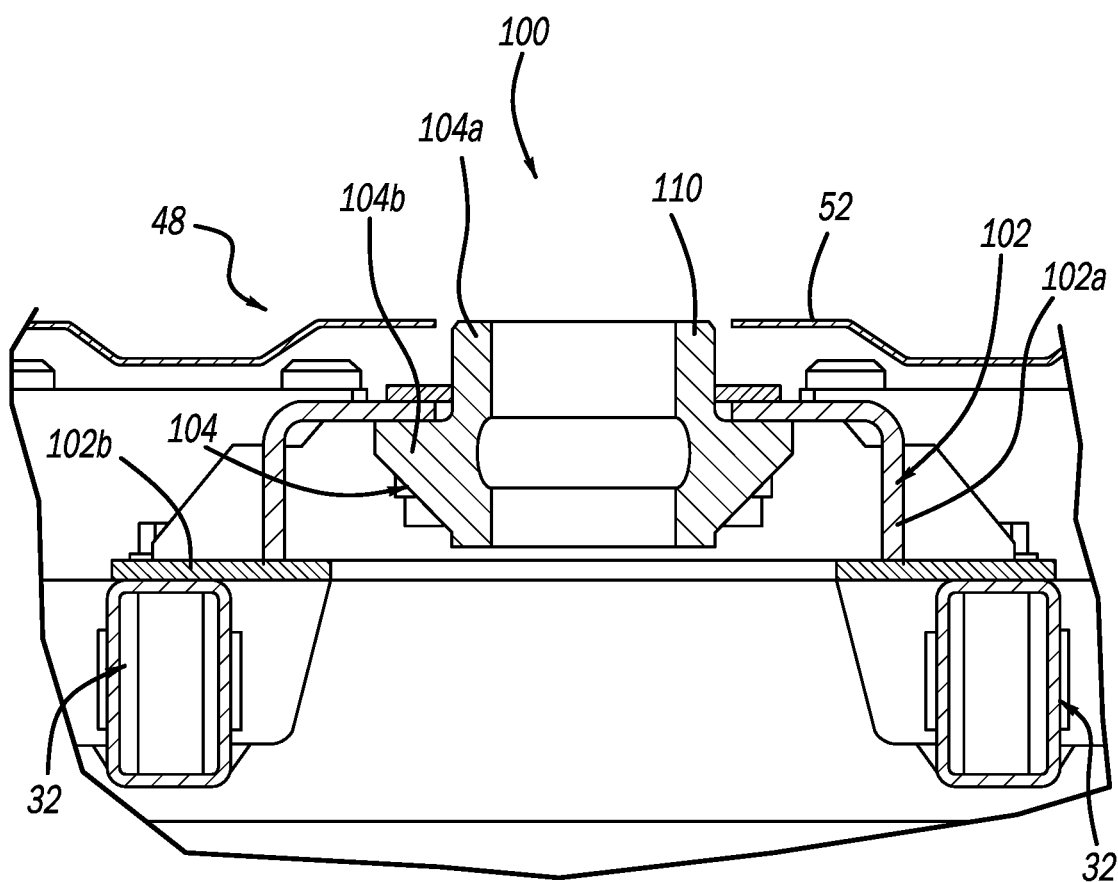
FIG. 9 is a cross-sectional view of the subframe attachment system taken along line 9-9 of FIG. 3.

With reference to FIGS. 2, 3, 7, and 9, an optional gooseneck attachment assembly 100 is mounted on upper portions of the pair of intermediate braces 32 (FIGS. 2, 3, and 9) and is configured to receive a gooseneck hitch/ball (not shown). As best shown in FIGS. 7 and 9, the gooseneck attachment assembly 100 comprises a mount frame 102 and a mount body 104. The mount frame 102 includes a body portion 102a and a flange portion 102b extending perpendicular from a periphery of the body portion 102a. The body portion 102a defines a central opening 106 and a plurality of mounting openings surrounding the central opening 106. As shown in FIG. 9, fasteners such as bolts or screws, for example, extend through the flange portion 102b and the pair of intermediate braces 32 to secure the mount frame 102 to the pair of intermediate braces 32. The mount body 104 includes a body portion 104a and a flange portion 104b. The body portion 104a comprises a gooseneck receiving feature 110 that extends upwardly through the central opening 106 of the mount frame 102 and the floor 48 of the cargo bed 14 and is accessible from the floor 48. In this way, the gooseneck hitch/ball can be mounted to the gooseneck receiving feature 110. In the example illustrated, the gooseneck receiving feature 110 is flush with ridges 52 of the cargo bed 14 (FIG. 9). In this way, cargo disposed within the cargo bed 14 is not obstructed by the gooseneck receiving feature 110. The flange portion 104b extends perpendicular from the body portion 104a and is mounted to an underside of the body portion 102a of the mount frame 102 via fasteners such as bolts or screws, for example.

The subframe attachment system 15 of the present disclosure is allowed to be retrofitted onto existing vehicles having cargo beds. The tethers 36 of the subframe attachment system 15 provide a robust connection between the attachment system 15 and the vehicle frame 26 while allowing full usage of the cargo bed 14. The mounting apertures 46, 84 of the front and rear brace assemblies 30, 34, respectively, allow the attachment system 15 to be used for other purposes other than means for securing a fifth wheel or a gooseneck.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A subframe attachment system for a vehicle having a cargo bed, the subframe attachment system comprising:
   a front brace extending in a transverse direction of the vehicle and configured to be mounted to a pair of longitudinal rails of a main frame of the vehicle, the front brace comprising front mounting apertures configured to be accessible from the cargo bed;
   a rear brace assembly spaced apart from the front brace and extending in the transverse direction of the vehicle, the rear brace assembly configured to be mounted to the main frame and comprising rear mounting apertures configured to be accessible from the cargo bed; and
   a plurality of tethers, each tether comprising a first end rotatably coupled to the rear brace assembly and a second end configured to be mounted to respective longitudinal rails of the pair of longitudinal rails.

2. The subframe attachment system of claim 1, wherein the rear brace assembly is configured to be mounted to a cross member of the main frame of the vehicle and comprises a first connecting brace and a second connecting brace, and wherein the first connecting brace is configured to be disposed within the cross member and the second connecting brace is configured to be disposed on the cross member.

3. The subframe attachment system of claim 2, further comprising a first set of fasteners extending through the first connecting brace and configured to mechanically fasten the first connecting brace to the pair of longitudinal rails and a second set of fasteners extending through the second connecting brace and configured to mechanically fasten the second connecting brace to the cross member.

4. The subframe attachment system of claim 2, wherein the tethers are rotatably coupled to the second connecting brace of the rear brace assembly.

5. The subframe attachment system of claim 2, further comprising:
   a pair of spaced apart intermediate braces secured to the front brace and the second connecting brace and extending in a longitudinal direction of the vehicle; and
   a gooseneck attachment assembly mounted on the pair of intermediate braces.

6. The subframe attachment system of claim 1, wherein each tether further comprises a body connecting the first end and the second end, and wherein the body comprises a varying cross-section.

7. The subframe attachment system of claim 1, wherein the second end of each tether comprises a compression tube configured to extend at least partially through a respective longitudinal rail of the pair of longitudinal rails.

8. The subframe attachment system of claim 1, further comprising:
   brackets configured to be disposed within respective longitudinal rails of the pair of longitudinal rails; and
   fasteners extending through the front brace and the brackets and configured to mechanically fasten the front brace and the brackets to the respective longitudinal rails.

9. The subframe attachment system of claim 8, wherein the brackets include a first portion extending in a horizontal direction and a second portion extending in a vertical direction from the first portion, and wherein the first portion includes an integral nut that receives a respective fastener of the fasteners.

10. The subframe attachment system of claim 1, further comprising:
- a pair of spaced apart intermediate braces secured to the front brace and the rear brace assembly and extending in a longitudinal direction of the vehicle; and
- a gooseneck attachment assembly mounted to the pair of intermediate braces.

11. The subframe attachment system of claim 10, wherein the gooseneck attachment assembly comprises:
- a mount frame mounted to the pair of intermediate braces; and
- a mount body secured to the mount frame and comprising a gooseneck receiving feature accessible from the cargo bed.

12. A subframe attachment system for a vehicle having a cargo bed, the subframe attachment system comprising:
- a front brace extending in a transverse direction of the vehicle and configured to be mounted to a pair of longitudinal rails of a main frame of the vehicle, the front brace comprising front mounting apertures configured to be accessible from the cargo bed;
- a rear brace assembly spaced apart from the front brace and extending in the transverse direction of the vehicle, the rear brace assembly configured to be mounted to a cross member of the main frame of the vehicle and comprising a first connecting brace, a second connecting brace and rear mounting apertures, the first connecting brace configured to be disposed within the cross member, the second connecting brace configured to be disposed on the cross member, the rear mounting apertures secured to the second connecting brace and configured to be accessible from the cargo bed; and
- a plurality of tethers, each tether comprising a first end rotatably coupled to the second connecting brace and a second end configured to be mounted to respective longitudinal rails of the pair of longitudinal rails.

13. The subframe attachment system of claim 12, further comprising:
- a pair of spaced apart intermediate braces secured to the front brace and the second connecting brace and extending in a longitudinal direction of the vehicle; and
- a gooseneck attachment assembly mounted on the pair of intermediate braces.

14. The subframe attachment system of claim 12, wherein each tether further comprises a body connecting the first end and the second end, and wherein the body comprises a varying cross-section.

15. The subframe attachment system of claim 12, wherein the second end of each tether comprises a compression tube configured to extend at least partially through a respective longitudinal rail of the pair of longitudinal rails.

16. The subframe attachment system of claim 12, further comprising:
- brackets configured to be disposed within respective longitudinal rails of the pair of longitudinal rails; and
- fasteners extending through the front brace and the brackets and configured to mechanically fasten the front brace and the brackets to the respective longitudinal rails.

17. The subframe attachment system of claim 16, wherein the brackets include a first portion extending in a horizontal direction and a second portion extending in a vertical direction from the first portion, and wherein the first portion includes an integral nut that receives a respective fastener of the fasteners.

18. A vehicle comprising:
- a cargo bed including a floor panel; and
- a subframe attachment system located substantially underneath the floor panel, the subframe attachment system comprising:
  - a front brace extending in a transverse direction of the vehicle and configured to be mounted to a pair of longitudinal rails of a main frame of the vehicle, the front brace comprising front mounting apertures extending through the floor panel of the cargo bed;
  - a rear brace assembly spaced apart from the front brace and extending in the transverse direction of the vehicle, the rear brace assembly configured to be mounted to the main frame and comprising rear mounting apertures extending through the floor panel of the cargo bed; and
  - tethers rotatably coupled to the rear brace assembly and configured to be mounted to respective longitudinal rails of the pair of longitudinal rails.

19. The vehicle of claim 18, wherein the cargo bed comprises a plurality of ridges, and wherein the front and rear mounting apertures are positioned below the ridges.

20. The vehicle of claim 18, wherein the subframe attachment system further comprises:
- a pair of spaced apart intermediate braces secured to the front brace and the rear brace assembly and extending in a longitudinal direction of the vehicle; and
- a gooseneck attachment assembly mounted on the pair of intermediate braces.

* * * * *